Oct. 9, 1928.

H. F. SCHMIDT 1,687,109

POWER PLANT

Filed July 15, 1925  4 Sheets-Sheet 1

Oct. 9, 1928.

H. F. SCHMIDT

POWER PLANT

Filed July 15, 1925

1,687,109

4 Sheets-Sheet 2

H.F. Schmidt
INVENTOR

BY

ATTORNEY

Oct. 9, 1928.

H. F. SCHMIDT 1,687,109

POWER PLANT

Filed July 15, 1925

4 Sheets-Sheet 3

WITNESSES:

H.F. Schmidt
INVENTOR

BY
ATTORNEY

Oct. 9, 1928. 1,687,109
H. F. SCHMIDT
POWER PLANT
Filed July 15, 1925 4 Sheets-Sheet 4

WITNESSES:

H.F. Schmidt
INVENTOR

BY
ATTORNEY

Patented Oct. 9, 1928.

1,687,109

UNITED STATES PATENT OFFICE.

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA.

POWER PLANT.

Application filed July 15, 1925. Serial No. 43,806.

My invention relates to power plants, particularly to power plants which are especially adapted for driving mechanical stokers and it has for an object to provide a power plant of the character designated which shall be entirely contained in a single, unitary structure and which shall operate efficiently and reliably.

It has for a further object to embody in the power plant suitable apparatus for accurately governing its speed of operation together with means for easily changing its speed of operation to suit widely changing plant conditions.

Figure 1:
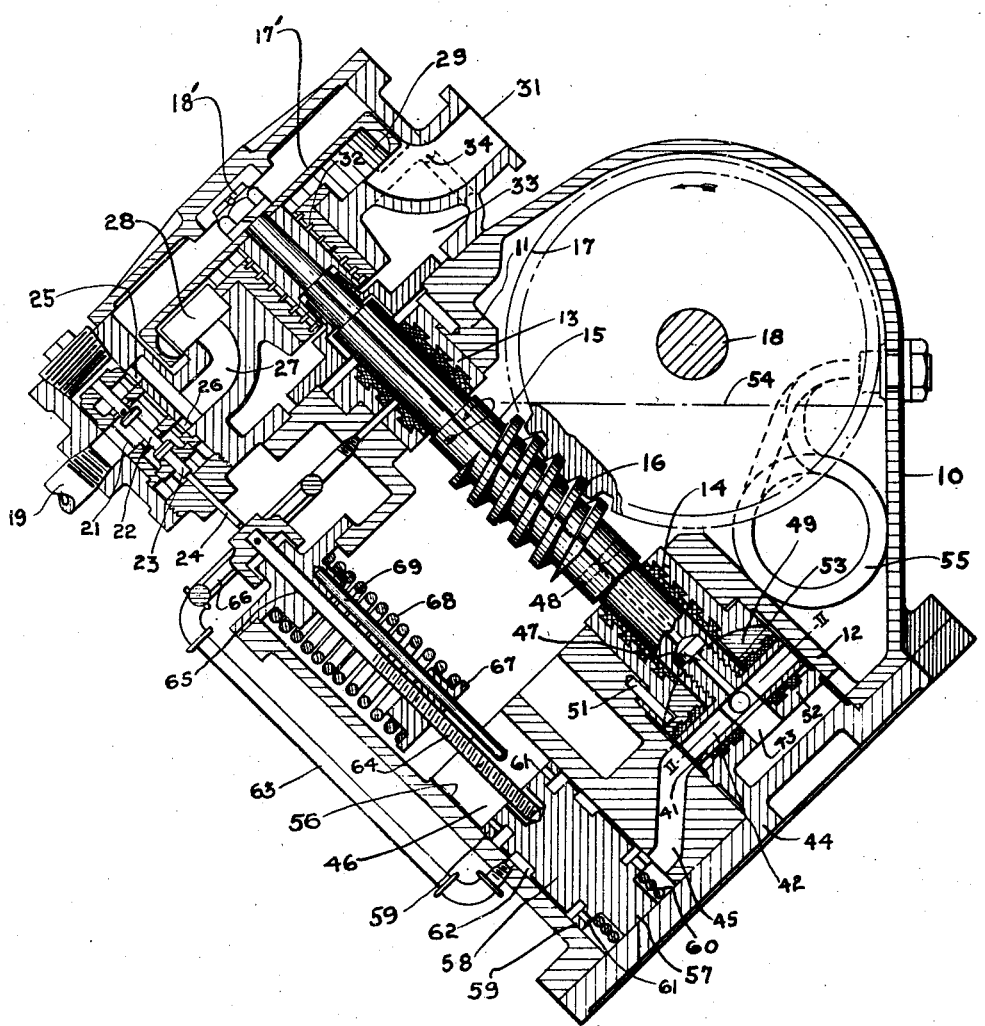
Figure 6:
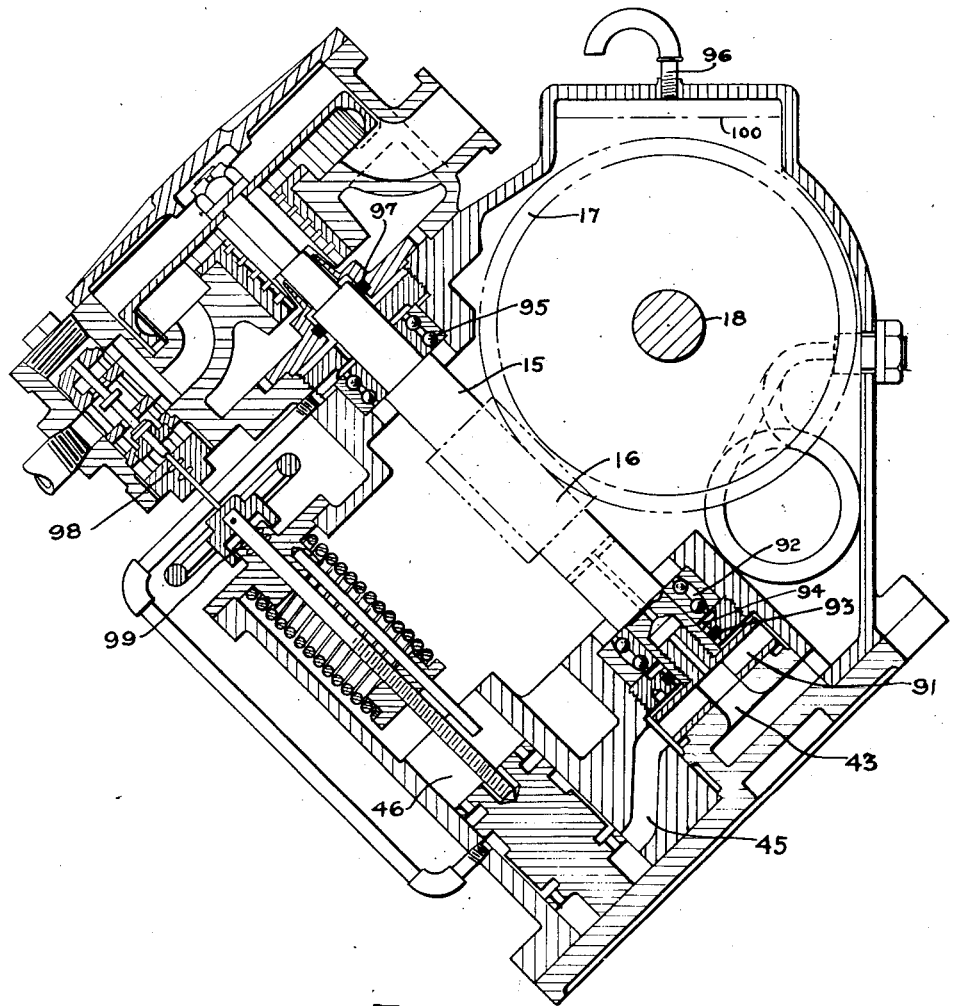
Figure 2:
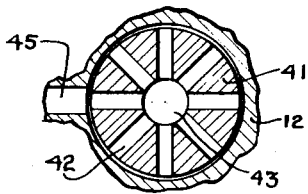
Figure 4:
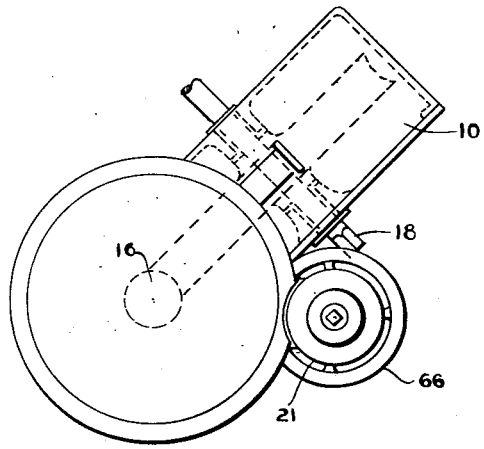
Figure 3:
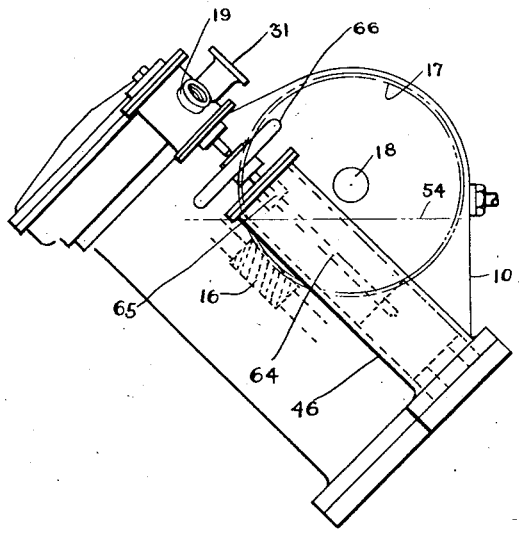
Figure 5:
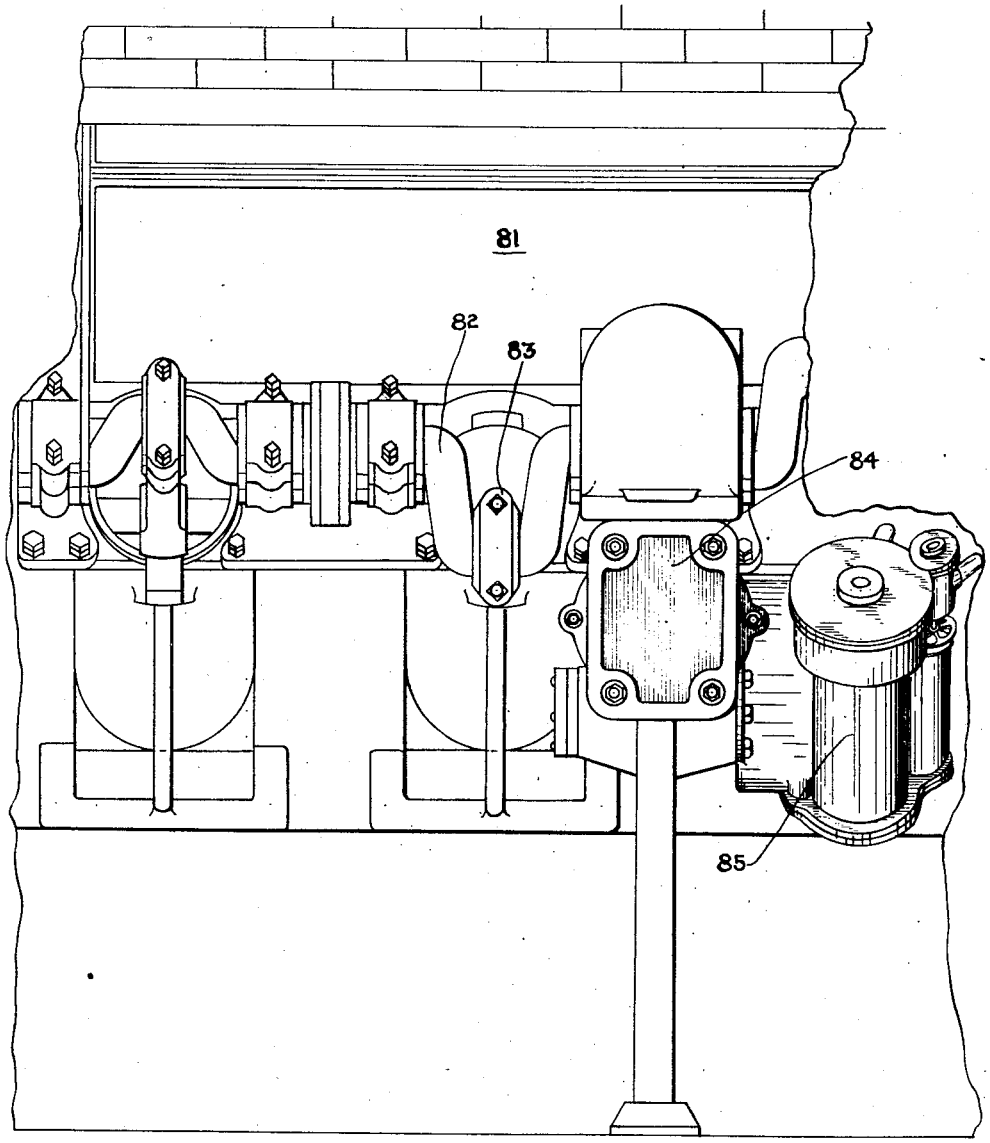

These and other objects, which will be made apparent throughout the further description of my invention, may be attained by the employment of the apparatus hereinafter described and illustrated in the accompanying drawings in which:

Fig. 1 is a view, in sectional elevation, of one form of power plant arranged in accordance with my invention and which shows, for purposes of illustration only, the governing mechanism arranged in a plane which is common to the turbine and the gears; Fig. 2 is a partial view, in section, taken on the line II—II of Fig. 1; Fig. 3 is a view, in elevation, showing the preferred location of the governing mechanism with respect to the turbine and the gears; Fig. 4 is a view, in elevation, looking downward upon the power plant shown in Fig. 3 and is taken in a plane normal to the axis of the turbine; Fig. 5 is a view, in elevation, showing the application of my novel form of power plant to a mechanical stoker for driving the same and Fig. 6 is a view, in sectional elevation, of another embodiment of my power plant which is similar to that shown in Fig. 1 with the exception that the thrust bearing and the lubricating oil pump are embodied in separate structures and that the housing is almost entirely filled with the lubricant.

Briefly speaking, my invention comprises a prime mover, such as an elastic fluid turbine, having associated therewith a reduction gear for so altering its speed of rotation as to make it adaptable for driving various forms of relatively slow moving power plant apparatus such as mechanical stokers.

Associated with the turbine is a fluid pressure operated governor for accurately controlling its speed of rotation, suitable regulating apparatus being embodied in the governor for readily adjusting its operating speed to suit the changing requirements of the driven apparatus. Suitable pressure developing means for supplying fluid to the governor as well as lubricant to the bearings is operatively connected to the turbine shaft. Embodied in the pressure developing means is a bearing for withstanding the axial thrust exerted by both the turbine and the gear. The above apparatus is entirely supported in a unitary housing adapted to contain a substantial body of lubricant and so arranged that the axis of the driving gear is inclined at an acute angle from the vertical, whereby the usual gyratory or precessive motion of a vertically disposed shaft is eliminated and the shaft caused to bear against only one side of the supporting bearings. Furthermore, by so inclining the axis of the turbine and the driving gear, a sufficient body of lubricant may be retained in the housing as will completely immerse the engaging teeth of the gears as well as the pressure developing mechanism without requiring the use of fluid tight closures or stuffing boxes for the driven shaft.

Referring to the drawings for a more detailed description of my invention, I show in Fig. 1, a housing 10 which is provided with upper and lower supporting members 11 and 12 having a common axis arranged at some acute angle from the vertical such, for example, as 45 degrees. Provided in the upper and lower supporting members 11 and 12 are respective upper and lower bearings 13 and 14 for carrying a drive shaft 15. Provided on the drive shaft 15 is a driving gear, such as a worm 16, which meshes with a driven gear or worm wheel 17 journalled in the housing 10 through a driven shaft 18.

Provided on the upper end of the driving shaft 15 is a turbine rotor 17' which is secured against a shoulder provided on the shaft by a nut 18'. Steam is supplied to the turbine rotor 17' through an inlet connection 19 provided in the housing 10, which inlet connection communicates with an admission valve chamber 21. Provided in the admission valve chamber 21 is a valve 22 having a valve stem 23 and a tappet 24 for controlling the flow of steam through the chamber. The valve 22 may be constructed in one of various ways, but is preferably of the double ported type having the areas of its respective seats so proportioned as to cause the steam pressure to move the valve toward an open position, that is, the position illustrated.

The admission valve chamber 21 communicates through duplex ports 25 and 26 and a nozzle passage 27 with a nozzle block 28 for directing steam against the blades of the turbine rotor 17', in a manner well known in the art. Steam discharged from the turbine rotor 17' enters an annular exhaust chamber 29 having provided therein an exhaust connection 31. Leakage of fluid from the exhaust chamber 29 to the remaining portion of the housing 10 is prevented by means of a labyrinth packing element 32 which may be of any well known form. Disposed adjacent to the exhaust chamber 29 is an annular chamber 33 which is vented to the atmosphere through suitable ports, such as 34, whereby that portion of the housing containing the gear may be liberated of oil vapor and various gases which may accumulate therein.

Secured to the lower end of the drive shaft 15 is a thrust collar 41. As shown in Fig. 2, the thrust collar 41 is provided with a plurality of radially disposed openings or passageways 42 which connect at their inner ends with an oil inlet 43 located in a cover plate 44 provided in the housing. The thrust collar 41 is so arranged that the lubricant drawn through the inlet 43 is pumped radially outward in the manner of a centrifugal pump into the lower supporting member 12 from which it is conveyed through a passage 45 to a pressure responsive mechanism 46. Located co-axially within the shaft is a vent passage 47 which communicates at its lower end with the center of the thrust collar 41 and at its upper end, through radially disposed holes 48, with the interior of the housing 10.

Located at one side of the thrust collar is an upper thrust bearing 49 which is spherically seated in the lower shaft bearing 14 and is prevented from rotating with the shaft by means of a fixed pin 51. Located on the opposite side of the thrust collar 41 is a lower thrust bearing 52 which, in the construction illustrated, is embodied in the cover plate 44. As arranged, the thrust collar 41 together with its cooperating bearings 49 and 52 assume the unbalanced axial thrust of not only the turbine rotor 17', but also of the worm 16, while the radial passages 42 provided in the collar act in the well known manner of a centrifugal pump to translate lubricant from the passage 43 and discharge it to the pressure responsive mechanism and to the bearings 13 and 14. Oil is conveyed to the latter from the periphery of the thrust collar 42 by means of an axially disposed oil groove 53 which communicates with the oil clearance normally provided between the thrust bearing 49 and its cooperating thrust collar 41.

The level of the oil contained in the housing is indicated at 54 and, as is apparent from the drawings, the arrangement of the entire structure is such that while the oil level 54 completely immerses the meshing teeth of the worm 16 and the worm wheel 17, nevertheless, this level is below the axis of the drive shaft 18 so that no stuffing boxes or other fluid tight closures are required where this shaft passes outwardly through the housing. The drive shaft 15 is so arranged that the combined thrust bearing and lubricating oil pump, as embodied in the thrust collar 41 and the bearings 49 and 52, is immersed in the body of lubricant contained in the housing.

If found desirable, I may provide a coil 55 for circulating water or some other cooling fluid through the housing for maintaining the lubricant at any desired temperature.

As stated heretofore, lubricant discharged by the thrust collar 41 is conveyed to the passage 45 which communicates with the pressure responsive mechanism 46. The pressure-responsive mechanism 46 comprises a cylinder 56 having disposed therein a piston 57 which may be of any well-known type but which is preferably of the form illustrated.

As illustrated, the piston 57 comprises a central portion 58 which is rather loosely fit within the cylinder, and relatively short end portions 59—59, which are closely fit within the cylinder. Provided in the end portions 59 are circumferentially spaced holes 61—61 for equalizing the fluid pressure acting upon portions of their oppositely disposed faces. The advantage of this form of piston resides in the fact that the unusually close clearances, which it is possible to provide between the relatively short end portions and the cylinder wall, ensures the retention of the entire piston exactly coaxial with respect to the cylinder, thereby permitting it to move freely within the cylinder at all times.

As the movements of the piston 57 are in response to changes in fluid pressure, I have provided a compression spring 60 between the cover plate 44 and the piston, whereby the weight of the latter as well as the various parts movable therewith is compensated for. By so compensating for the weight of the various moving parts, more sensitive movements of the piston and thus greater speed variation consistent with the fluid pressure changes may be obtained.

Provided in the piston 57 is an annular recess 62 for conveying a portion of the oil which escapes upwardly between the piston and the walls of the cylinder to a conduit 63 which connects with the upper bearing 13. The resistance to flow past the piston is such as to reduce the pressure of the oil sufficiently to make it suitable for bearing lubrication purposes.

Abutting the upper end of the piston 57 is a piston rod 64 which is slidably arranged in a bearing 65 provided in the housing 10.

Secured to the piston rod 64 is a hand wheel 66 for regulating the operating speed of the turbine. The hand wheel 66 is so arranged with relation to the tappet 24 that movements of the piston 57 are transmitted directly to the valve 22. Threaded upon the piston rod 64 is an adjusting nut 67 for retaining a compresion spring 68 which counteracts the pressure of the oil acting upon the lower face of the piston 57. A suitable guide rod 69 is fixed in the housing 10 and is slidably disposed, in an axial direction, in the adjusting nut 67 for preventing rotational movement thereof about the piston rod 64.

The operation of the above embodiment of my invention is as follows: Steam is normally supplied through the inlet 19 to the admission valve chamber 21 from whence it passes through the ports 25 and 26 and the nozzle passage 27 to the nozzle block 28. The flow of steam through the valve chamber is controlled by the double ported valve 22 having the areas of its seats so proportioned with respect to each other that the steam pressure tends to open the valve. The steam discharged from the nozzle block 28 is impelled against the turbine rotor 17 for driving the shaft 15 in a manner well understood in the art, and is exhausted from the housing through the annular exhaust chamber 29 and the exhaust connection 31. The rotation of the shaft 15 moves the worm 16 which drives the worm wheel 17. Any apparatus which it may be desired to drive is therefore connected to the driven shaft 18.

Leakage of air or steam between the exhaust chamber 29 and the vent chamber 33 is prevented by the packing element 32. The exhaust pressure acting upon the unbalanced lateral surfaces of the turbine rotor creates an axial thrust which is transmitted through the drive shaft 15 and the thrust coller 41 to either the upper thrust bearing 49 or the lower thrust bearing 52, depending upon the direction of unbalance. The transmission of power from the worm 16 to the worm wheel 17 also creates an axial thrust which is absorbed by either of the thrust bearings 49 or 52, the direction of this thrust depending upon the type of gear used and the direction of rotation. Attention is directed to the fact that I have considerably simplified the construction of power plants of this character by so coordinating the apparatus that a single thrust bearing may be utilized to absorb both the unbalanced thrust of the turbine and the thrust exerted by the meshing gears. The entire thrust bearing structure is disposed well before the level of the lubricant, which is indicated at 54, and thorough lubrication thereof is effected at all times.

The rotary action of the thrust collar 41 withdraws oil from the housing through the passage 43 and discharges it, in the well-known manner of a centrifugal pump, radially outward to the cylinder 12 at a normal pressure of, for example, 50 pounds per square inch. As such a form of apparatus develops a fluid pressure which varies directly as the square of its speed of rotation, it is apparent that the thrust collar 41, being directly connected to the turbine rotor 17 through the shaft 15, will develop a variable pressure which can be readily utilized for governing purposes. A quantity of the lubricant discharged by the thrust collar 41 is pumped between the bearing surfaces of the thrust collar and the thrust bearings and a portion is thence conveyed through the oil groove 53 to the lower bearing 14 for lubricating the same, after which it returns to the large body of oil contained in the housing. Foreign particles of fluid, such as air and other non-condensible gases, are removed from the lubricant by what might be termed gravitational separation and pass upwardly through the vent 47 and the radial passages 48 and are liberated to the housing. Such an arrangement insures that the fluid discharged by the thrust collar 41 is substantially free of entrained air and hence the pressure developed by the thrust collar is solely dependent upon the rotational speed of the drive shaft 16.

The fluid pressure developed by the thrust collar 41 acts upon the lower face of the piston 57 to move the same upwardly in a direction opposing the force exerted by the compression springs 68. The compression spring 68 is so proportioned with respect to the diameter of the piston 57 and the pressure of the fluid normally developed by the thrust collar, that the piston 57, through the piston rod 64 and the tappet 24, continually actuates the valve 22 so as to accurately control the amount of steam passing through the valve chamber, thereby accurately maintaining the desired operating speed. Any tendency for the speed of the turbine to change is accompanied by changes in the fluid pressure developed by the thrust collar resulting in corresponding movements of the piston 57 either in a direction to close the valve or in a direction permitting it to open. Fluid pressure operated governors of this type have been found to provide an extremely sensitive and effective form of governing mechanism.

One of the principal advantages of my novel structure resides in the fact that the apparatus may be operated at an infinite number of different speeds. A change in speed may be effected merely by adjusting the hand wheel 66, the movement of the nut 67 affecting the length of the spring 68 and the force exerted thereby. By increasing or decreasing the force exerted by this spring, the pressure of the fluid required to act upon the piston 57 is so regulated that any desired operating speed may be readily obtained.

A portion of the oil discharged to the cylinder 56, which normally has a pressure of about 50 pounds per square inch, escapes upwardly through the working clearances provided between the piston 57 and the walls of the cylinder 56, the resistance to flow being such that its pressure is incidentally reduced to approximately 5 pounds per square inch. At this pressure, the lubricant is conveyed by means of the conduit 63 to the upper bearing 13 from whence it drains downwardly into the large body of oil contained in the housing.

It is, therefore, apparent that an adequate oil pressure is available at all times for actuating the fluid pressure operated governor, while oil at a lower pressure, such as is satisfactory for lubricating purposes, is also available. The entire structure being arranged in a single unitary structure, all oil is retained in the system and the movements of the various operating parts are not affected or retarded by packing glands or similar devices. The disposition of the drive shaft 15 at substantially the angle illustrated, prevents gyratory or precessive movements of the shaft in the bearings, which movements usually occur in the case of a vertically disposed shaft. It also permits the combined thrust bearing and lubricating oil pump structure to be disposed below the level of the lubricant, which condition could not be readily obtained were the shaft horizontal.

While for the purpose of simplifying the illustration, I have shown, in Fig. 1, the pressure responsive mechanism 46 and the admission valve chamber 21 located in a plane common to the longitudinal axis of the driving gear 16 and the transverse axis of the driven gear 17, I prefer to position the pressure responsive mechanism and the admission valve chamber with respect to the driving and driven gears as shown in Figs. 3 and 4. As is apparent from these figures, the pressure responsive mechanism and the admission valve chamber are preferably rotated about the axis of the turbine and the driving gear, from the location shown in Fig. 1, a sufficient amount to permit the piston rod 64 to pass through the gland 65 at a point located above the lubricant level 54. Such an arrangement avoids the requirement for any packing glands or stuffing boxes such as might interfere with the freedom of movement of the piston rod 64. As arranged, the entire pressure responsive mechanism, while embodied in the lubricant containing housing 10, is nevertheless entirely free to move in response to the slightest changes in fluid pressure.

In Fig. 5 I show the application of my novel power plant to a mechanical stoker for driving the same. In this figure, 81 represents a furnace front provided with a stoker crank shaft 82 for actuating, through connecting rods 83, a plurality of reciprocating pushers or rams (not shown) for feeding fuel into the furnace in a manner well understood in the art. The crank shaft 82 is driven through a selective speed box 84 by the power plant 85 which is similar to that illustrated in Figs. 1 and 2. As is apparent from the drawing, my power plant or stoker drive mechanism is so arranged that it may be readily secured to the side of such gear boxes as is usually provided in installations of this character. The entire drive mechanism is compact and self-contained and greatly simplifies that portion of the stoker drive structure which must be provided on the furnace front.

While I have shown one form of power plant in which the thrust bearing and the lubricating oil pump are combined in a single structure, nevertheless, it is obvious that I may, as shown in Fig. 6, embody these two elements in separate structures. In such an arrangement, I may provide an impeller pump 91 for receiving lubricant from the passage 43 and for discharging it to the pressure-responsive mechanism 46. An independent thrust bearing 92 may be provided for withstanding the thrust exerted by both the turbine and the meshing gears, which thrust bearing may also serve as a steady bearing for the drive shaft 15. A sealing ring 93 is provided between the impeller 91 and the bearing 92 for preventing the escape of the fluid pressure. However, I may so arrange this ring as to permit leakage of some of the fluid, at a relatively lower pressure, through a passage 94 to the bearing 92 for lubricating the same. A similar form of steady bearing 95 may be provided at the upper end of the drive shaft 15. I may also, if found desirable, completely fill that portion of the housing containing the gears with lubricant to a level, such as indicated at 100, and I have therefore provided a vent pipe 96 at the top of the housing as well as fluid tight packing elements 97, 98 and 99. In all other respects, this embodiment may be similar to that shown and described in relation to Fig. 1.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In power plant apparatus, the combination of a shaft, a turbine for driving the shaft, a driving gear provided on the shaft, a driven gear meshing with the driving gear, the region of enmeshment of the gears being below the axis of the driven gear, a housing enclosing the gears and adapted to contain a body of lubricating liquid, and a fluid-translating device having its inlet communicating with the interior of the lower portion of said housing, said fluid-translating device being driven by the shaft, whereby when the device is in operative position the level of the lubricating liquid may be above the intermeshing gears and below the axis of the driven gear.

2. In power plant apparatus, the combination of a shaft, a turbine for driving the shaft, a driving gear provided on the shaft, a driven gear meshing with the driving gear, the region of enmeshment of the gears being below the axis of the driven gear, a housing enclosing the gears and adapted to contain a body of lubricating liquid, and a fluid-translating device having its inlet in communication with the lower portion of the housing, said fluid-translating device being provided on the shaft, whereby when the device is in operative position the level of the lubricating liquid may be above the intermeshing gears but below the axis of the driven gear.

3. In power plant apparatus, the combination of a shaft having its axis inclined at an acute angle from the vertical, a turbine having its rotor located on the shaft, a driving gear provided on the shaft, a gear meshing with the driving gear and having a substantially horizontal axis, a housing containing a body of lubricating liquid, and a fluid-translating device immersed in the liquid, said fluid-translating device being driven by the shaft, whereby when the device is in operative position the level of the lubricating liquid may be above the intermeshing gears but below the axis of the driven gear.

4. In a power plant, the combination of a shaft, a turbine having its rotor carried by the shaft, a mechanism responsive to fluid pressure for controlling the admission of motive fluid to the turbine, a housing for supporting the turbine and having a bearing extending through the upper portion thereof and a bearing in the lowermost portion thereof for said shaft, a driving gear connected to the shaft and arranged within said housing, a driven gear meshing with the driving gear and the region of enmeshment being arranged below the axis of the driven gear, said housing being adapted to contain lubricant at a normal level below the axis of the driven gear but above the region of gear enmeshment, and a pump driven by the shaft and located below the level of lubricant for developing fluid pressure for actuating the pressure responsive mechanism.

5. In power plant apparatus, the combination of a housing structure providing an interior lubricant chamber, a driven shaft extending within and horizontally of the chamber, a driving shaft extending through the upper portion of the housing structure and transversely of the driven shaft, a bearing within the housing for the lower end of the driving shaft, and gearing connecting the driving and driven shafts with the region of enmeshment below the axis of the driven shaft.

6. In power plant apparatus, the combination of a housing structure providing an interior lubricant chamber, a driven shaft extending within and horizontally of the chamber, a supporting flange carried by the housing structure and surrounding the driven shaft, a driving shaft extending within and through the upper portion of the housing structure and transversely of the driven shaft, a bearing within the housing for the lower end of the driving shaft, and gearing connecting the driving and driven shafts with the region of enmeshment below the axis of the driven shaft.

7. In power plant apparatus, the combination with a turbine having a rotor and an admission valve, of a housing structure providing an interior lubricant chamber, a driven shaft extending within and horizontally of the chamber, a driving shaft extending through the upper portion of the housing structure and transversely of the driven shaft, a bearing for the driving shaft extending through the upper portion of said housing structure and a bearing within said housing structure for the lower end of the driving shaft, gearing connecting the driving and driven shafts with the region of enmeshment below the axis of the driven shaft, and governor apparatus for controlling the admission valve including pressure responsive means and driving shaft operated pressure developing means both in communication with the lower portion of said chamber, whereby lubricant is received from said chamber, to operate the governor apparatus and surplus lubricant escaping from the governor apparatus is discharged into the chamber.

8. The combination with a fluid turbine having a rotor and an admission valve, of a driven shaft, a rotor shaft supporting the rotor, a casing structure having bearings for the rotor shaft and openings above the lowermost bearing for the driven shaft, said structure forming a chamber across which said shafts extend and said chamber adapted to have lubricant therein at a level below the openings for the driven shaft, oil governor apparatus for controlling the admission valve and including pressure responsive means and rotor-operated pressure developing means both in communication with the lower portion of said chamber, whereby operating oil is received from said chamber and surplus oil escaping from the governor is discharged thereinto.

9. In prime mover apparatus, the combination of a housing structure providing an interior lubricant chamber, a driven shaft extending within and transversely of the chamber, a flange carried by the housing structure and disposed about the driven shaft, a driving shaft extending through the upper portion of the housing structure and transversely of the driven shaft, a bearing within the housing for the lower end of the driving shaft, and gearing connecting the driving and driven shafts with the region of enmeshment below the axis of the driven shaft.

10. In prime mover apparatus, the combination of a housing structure providing an interior lubricant chamber, a driven shaft extending within and transversely of the chamber, a flange carried by the housing for supporting the latter and disposed about the driven shaft, a driving shaft extending through the housing structure and transversely of the driven shaft, bearings mounted in the housing structure for the driving shaft, and gearing connecting the driving and driven shafts and disposed within the interior lubricant chamber.

11. The combination with a driven machine having an operating member, of prime mover apparatus therefor comprising a housing structure providing an interior chamber, a driving shaft disposed in said structure, bearings for the driving shaft mounted in said structure, intermeshing reduction gearing disposed within said chamber and including a driving gear carried by the driving shaft and a driven gear meshing therewith, means for connecting the driven gear to the operating member, a turbine rotor overhung on said driving shaft, and means for supporting said housing structure entirely from the driven machine.

12. The combination with a driven machine having an operating member, of prime mover apparatus therefor comprising a housing structure providing an interior chamber, a driving shaft disposed in said structure, bearings for the driving shaft mounted in said structure, intermeshing reduction gearing disposed within said chamber and including a driving gear carried by the driving shaft and a driven gear meshing therewith, means for connecting the driven gear to the operating member, a turbine rotor mounted on said driving shaft, and means for supporting said housing structure entirely from the driven machine.

In testimony whereof, I have hereunto subscribed my name this third day of July, 1925.

HENRY F. SCHMIDT.